US009581819B1

(12) United States Patent
Boggs et al.

(10) Patent No.: US 9,581,819 B1
(45) Date of Patent: Feb. 28, 2017

(54) SEE-THROUGH AUGMENTED REALITY SYSTEM

(71) Applicant: Lockheed Martin Corporation, Bethesda, MD (US)

(72) Inventors: Richard P. Boggs, Orlando, FL (US); Patrick J. Goergen, Orlando, FL (US); Gregory A. Harrison, Oviedo, FL (US); Eric T. Sorokowsky, Winter Springs, FL (US); Edward T. Grant, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 35 days.

(21) Appl. No.: 14/573,664

(22) Filed: Dec. 17, 2014

(51) Int. Cl.
*G02B 27/01* (2006.01)
*G02B 27/00* (2006.01)

(52) U.S. Cl.
CPC ..... *G02B 27/0172* (2013.01); *G02B 27/0093* (2013.01); *G02B 27/0101* (2013.01); *G02B 2027/014* (2013.01); *G02B 2027/0178* (2013.01)

(58) Field of Classification Search
CPC ............ G02B 27/0172; G02B 27/0101; G02B 27/0093; G02B 2027/0178; G02B 2027/014
USPC ...................................... 345/694, 8
See application file for complete search history.

(56) References Cited

U.S. PATENT DOCUMENTS

| 4,767,334 A * | 8/1988 | Thorne .................. A63H 33/00 434/29 |
| 8,089,568 B1 * | 1/2012 | Brown ............... G02B 27/0172 349/11 |
| 8,625,200 B2 | 1/2014 | Smith et al. |
| 8,781,794 B2 | 7/2014 | Harrison et al. |

(Continued)

FOREIGN PATENT DOCUMENTS

WO    2008091422 A2    7/2008

OTHER PUBLICATIONS

Author Unknown, "Flight Simulator," Augmented Reality Flight Simulator, Date Accessed May 5, 2015, http://flightsimulatorr.net/2014/02/augmented-reality-simple-flight-simulator/, 2 pages.

(Continued)

*Primary Examiner* — Andrew Sasinowski
*Assistant Examiner* — Chineyere Wills-Burns
(74) *Attorney, Agent, or Firm* — Withrow & Terranova, PLLC (57) ABSTRACT

A see-through augmented reality system is disclosed. The system includes a head-wearable frame and a lens. The lens has at least one field-of-view (FOV). A sensor is configured to be coupled with respect to a head of a user. The sensor generates sensor data that changes responsive to movements of the head. A display apparatus is mapped to an interior surface of the lens. A controller is coupled to the sensor and to the display apparatus. The controller is configured to determine a current scene within the FOV based at least in part on the sensor data. The controller determines an out-the-window (OTW) scene portion of the current scene and a non-OTW scene portion of the current scene and generates OTW imagery that depicts the OTW scene portion. The (Continued)

controller causes the display apparatus to emit light in accordance with the OTW imagery toward the interior surface of the lens.

20 Claims, 7 Drawing Sheets

(56) References Cited

U.S. PATENT DOCUMENTS

| | | | | |
|---|---|---|---|---|
| 2007/0159673 A1* | 7/2007 | Freeman | ............... | G02B 5/1814 |
| | | | | 359/19 |
| 2008/0217473 A1* | 9/2008 | Diamandis | ............... | B64G 9/00 |
| | | | | 244/1 R |
| 2011/0227820 A1* | 9/2011 | Haddick | ............... | G02B 27/017 |
| | | | | 345/156 |
| 2012/0050143 A1* | 3/2012 | Border | ............... | G09G 3/3611 |
| | | | | 345/8 |
| 2012/0120498 A1 | 5/2012 | Harrison et al. | | |
| 2013/0162673 A1* | 6/2013 | Bohn | ............... | G02B 27/0172 |
| | | | | 345/633 |

OTHER PUBLICATIONS

Author Unknown, "augmented reality flight simulator," Bing Videos, Date Accessed May 5, 2015, http://www.bing.com/videos/search?q=augmented+reality+flight+simulator&qpvt=augmented+reality+flight+simulator&FORM=VDRE#view=detail&mid=444A66818D520449A18C444A66818D520449A18C, 3 pages.

* cited by examiner

SEE-THROUGH AUGMENTED REALITY SYSTEM

TECHNICAL FIELD

The embodiments relate generally to an augmented reality system and, in particular, to an optical see-through augmented reality system for use in a domeless simulator.

BACKGROUND

Commercial simulators, such as flight simulators, are relatively large systems that require a substantial amount of space. A flight simulator, for example, may include a large dome on which imagery is projected, and may include multiple projectors and image generators, which are costly, require a substantial amount of power, and generate a substantial amount of heat, which in turn increases environmental cooling requirements. As an example, one known flight simulator utilizes 25 projectors, requires a dome that is 20 feet in diameter, and utilizes 314 square feet of space. Such size requirements can limit the locations at which the simulator can be used. The use of a dome may also require special focus adjustments to any heads-up display (HUD) apparatus used in the simulator to make the HUD apparatus focus at the distance of the dome, increasing simulator configuration complexity.

Domeless simulators that utilize virtual reality (VR) headgear suffer a number of problems that detract from realism. For example, VR headgear displays imagery at a same focal length irrespective of whether an object depicted in the imagery is close to the participant, such as the cockpit, or far away from the participant, such as things that may be seen out the cockpit window. Moreover, movements of the participant that would naturally be seen by the participant in a non-VR simulation, such as movement of a cockpit control by the participant's hand, are often not depicted in the imagery even though during such movement the user's hand would come within the field-of-view of the participant if the participant were not wearing the VR headgear.

SUMMARY

The embodiments relate to an optical see-through augmented reality system for use in a domeless simulator. In one embodiment, the augmented reality system includes a head-wearable frame and a lens that is coupled to the head-wearable frame. The lens has at least one field-of-view (FOV) and an interior surface. A sensor is configured to be coupled with respect to a head of a user and to generate sensor data that changes responsive to movements of the head. A display apparatus is mapped to the interior surface of the lens. A controller is coupled to the sensor and to the display apparatus. The controller is configured to determine a current scene within the FOV based at least in part on the sensor data. The controller determines an out-the-window (OTW) scene portion of the current scene and a non-OTW scene portion of the current scene and generates OTW imagery that depicts the OTW scene portion. The controller causes the display apparatus to emit light in accordance with the OTW imagery toward the interior surface of the lens. The interior surface of the lens is configured to reflect the light toward an eye of the user.

In one embodiment, the display apparatus comprises a plurality of pixels, each pixel being mapped to a particular surface location of the interior surface of the lens. In one embodiment, the controller causes the display apparatus to turn off each pixel of the plurality of pixels other than pixels that display the OTW imagery.

In one embodiment, the controller is further configured to generate FOV imagery that includes the OTW imagery and non-OTW imagery and configured to modify the FOV imagery to mask the non-OTW imagery to generate the OTW imagery.

In one embodiment, the lens is configured to transmit light received from an exterior surface of the lens through the lens and out the interior surface of the lens and configured to reflect light received from the display apparatus toward an eye of the user.

In one embodiment, the sensor comprises an inertial measurement unit.

In one embodiment, the lens comprises a right eye lens and a left eye lens, and the at least one FOV comprises a right eye FOV and a left eye FOV. The display apparatus comprises a right eye display apparatus that is mapped to an interior surface of the right eye lens and comprises a left eye display apparatus that is mapped to an interior surface of the left eye lens. The controller is further configured to determine a current right eye scene within the right eye FOV and a current left eye scene within the left eye FOV. The controller determines an OTW right eye scene portion and an OTW left eye scene portion, generates right eye OTW imagery that depicts the OTW right eye scene portion, and generates left eye OTW imagery that depicts the OTW left eye scene portion. The controller causes the right eye display apparatus to emit light in accordance with the right eye OTW imagery toward the interior surface of the right eye lens, and causes the left eye display apparatus to emit light in accordance with the left eye OTW imagery toward the interior surface of the left eye lens.

In one embodiment, the system includes a platform comprising a cockpit comprising an instrument panel.

In one embodiment, the system includes a structure that is positioned over the cockpit and includes a darkening material that is configured to be positioned over the structure.

In another embodiment, a method is provided. The method includes receiving sensor data from a sensor coupled with respect to a head of a user, the sensor data identifying a location of the head and an orientation of the head. A controller determines a current scene based at least in part on the sensor data and a FOV of a lens. The controller determines an OTW scene portion of the current scene and a non-OTW scene portion of the current scene, and generates OTW imagery that depicts the OTW scene portion. The controller causes a display apparatus to emit light in accordance with the OTW imagery toward the interior surface of the lens.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps.

The embodiments relate to an optical see-through augmented reality system for use in a domeless simulator. The embodiments provide a user, such as a participant in a simulation, an actual view of a cockpit in seamless conjunction with a simulated view of an out-the-window (OTW) display. The embodiments utilize an augmented reality headset to provide the OTW display to the eyes of the user, and thus the embodiments need only one or two image generators to generate the OTW display. Among other advantages, the embodiments provide the view of the cockpit with normal optical properties and diopter, and eliminate the need for a dome, saving space, cost, and processing requirements. While for purposes of illustration the embodiments are described in the context of an aircraft, the embodiments are not limited to an aerial vehicle and have applicability in any context in which an operator utilizes an instrument panel while concurrently viewing a real world scene that is beyond the instrument panel, such as ground vehicles, boats, ground-moving or heavy-lifting equipment, and the like.

Figure 1:
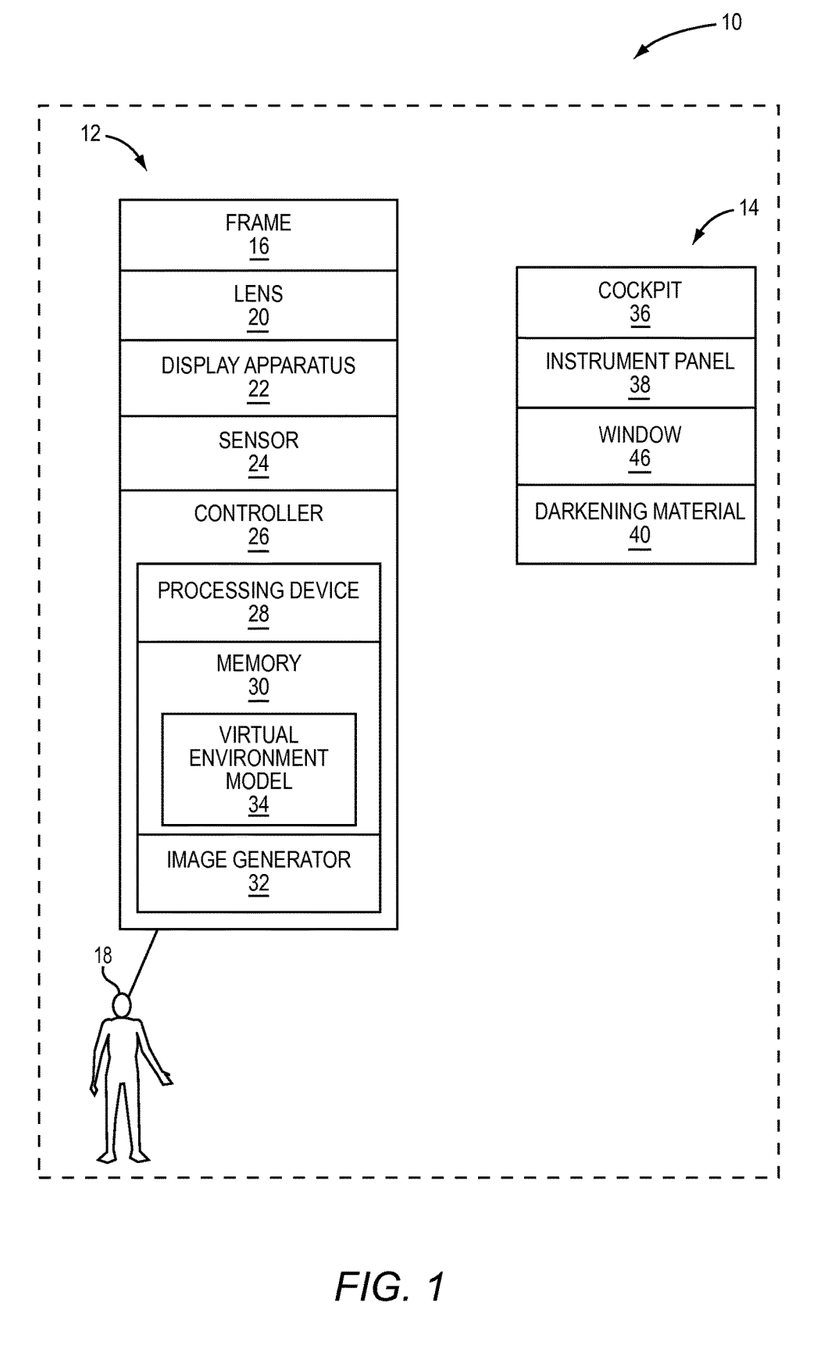
FIG. 1 is a block diagram of an environment in which embodiments may be practiced.

FIG. 1 is a block diagram of an environment 10 in which embodiments may be practiced. The environment 10 includes an augmented reality system 12 and a domeless simulator system 14 according to one embodiment. The augmented reality system 12 includes a head-wearable frame 16 that is configured to be coupled to a head of a user 18. By way of non-limiting example, the frame 16 may comprise any suitable structure that is capable of positioning one or more lenses 20 with respect to the eyes of the user 18. The frame 16, in one embodiment, may comprise an eyeglasses frame that couples to the head of the user 18 via two extensions, or arms, that are supported by the ears of the user 18, and a bridge that is supported by the nose of the user 18. In another embodiment, the frame 16 may comprise a flight helmet that is supported by the head of the user 18.

The lens 20 has transmissive characteristics or properties, such that light striking an exterior surface of the lens 20 is transmitted through the lens 20 and out an interior surface of the lens 20 toward the eyes of the user 18. The lens 20 also has reflective characteristics or properties, such that light projected onto the interior surface is reflected off the interior surface into the eyes of the user 18. The lens 20 also has a field-of-view (FOV) that determines the extent of the actual or virtual world that is observable at any given moment in time. While for purposes of discussion the lens 20 may be referred to in the singular, in some embodiments the lens 20 comprises two lenses: a right eye lens and a left eye lens. In such embodiments, each lens may have a FOV, which may be referred to as a right eye FOV and a left eye FOV, respectively. The right eye FOV and the left eye FOV collectively define an overall FOV for the augmented reality system 12. There may be overlap between the right eye FOV and the left eye FOV, with appropriate overlapping imagery generated for each eye.

The augmented reality system 12 also includes a display apparatus 22 that is mapped to the interior surface of the lens 20. In particular, the display apparatus 22 includes a plurality of light-emitting pixels. Again, while for purposes of discussion the display apparatus 22 may be referred to in the singular, in some embodiments the display apparatus 22 comprises two display apparatuses: a right eye display apparatus that is mapped to the right eye lens, and a left eye display apparatus that is mapped to the left eye lens. Each pixel of a respective display apparatus is mapped to a particular location on the interior surface of a corresponding lens 20, such that light emitted from such pixel will be reflected toward the eye of the user 18 from that particular location on the interior surface of the corresponding lens 20. For example, each pixel in the right eye display apparatus is mapped to a particular location on the interior surface of the right eye lens. Light emitted from a respective pixel of the right eye display apparatus is reflected from the particular location on the interior surface of the right eye lens that corresponds to that pixel into the corresponding right eye of the user 18. Light emitted from other pixels that do not correspond to that particular location on the interior surface of the right eye lens are not reflected into the right eye of the user 18 from that particular location of the interior surface of the right eye lens. Similarly, the pixels of the left eye display apparatus are mapped to particular locations on the interior surface of the left eye lens.

The augmented reality system 12 also includes a sensor 24 that generates sensor data that changes in response to movements of the head of the user 18. The sensor 24 may comprise any suitable sensor subsystem that is capable of generating data from which a location and an orientation of the head can be determined. In one embodiment, the sensor 24 comprises an inertial measurement unit (IMU) that is coupled to the head-wearable frame 16. In some embodiments, the sensor 24 is configured to generate sensor data from which rotational and/or translational acceleration of the head of the user 18 may be derived to facilitate predictions of head motion, to help reduce latency and/or lag in the imagery as the head of the user 18 moves.

A controller 26 provides various functionalities to the augmented reality system 12, as discussed in detail herein, and is coupled to the sensor 24 and, in some embodiments, to the display apparatus 22. The controller 26 includes one or more processing devices 28 and a memory 30. At least some of the functionality provided herein may be provided via computer instructions that are stored in the memory 30 and executed by the processing device 28.

An image generator (IG) 32 generates OTW imagery of a virtual environment that is presented to the user 18 based at least in part on a virtual environment model 34 that is stored in the memory 30. The virtual environment model 34 contains data that defines the virtual environment, such as the objects in the virtual environment, the state of the objects, and attributes and characteristics of the objects, as well as attributes and characteristics of the simulated vehicle, such as direction, altitude, speed, and the like. As will be discussed in greater detail below, the IG 32 determines a current FOV of the augmented reality system 12 based at least in part on the FOV of the lens 20 and the orientation and/or location of the head of the user 18, accesses the virtual environment model 34 to determine the state of the virtual environment at that moment in time, and generates the OTW imagery. The OTW imagery is then provided to the display apparatus 22 for presentation to the user 18. This process happens iteratively at a particular framerate, such as, by way of non-limiting example, 30, 60, or 120 frames per second, even as the virtual environment may be concurrently changing, such that objects depicted within the OTW imagery are moving with respect to the simulated vehicle. While for purposes of illustration the IG 32 is illustrated as being a component or element within the controller 26, this is merely one embodiment, and in other embodiments, the IG 32 may be separate from the controller 26 and may communicate with the controller 26 via a communications path.

While for purposes of illustration the virtual environment model 34 is illustrated as being maintained in the memory 30 of the controller 26, in other embodiments, the virtual environment model 34 may be maintained external to the augmented reality system 12. In particular, the virtual environment model 34 may be maintained by a device that is communicatively coupled to the augmented reality system 12, and to one or more other simulators, via a network, to allow for a multi-user simulation wherein other simulation systems, including possibly other augmented reality systems, access the virtual environment model 34 concurrently with the augmented reality system 12.

In one embodiment, the augmented reality system 12 has an ultra-wide FOV, such as in excess of 100 degrees. As discussed above, the augmented reality system 12 also includes a display apparatus 22 that is mapped to the interior surface of the lens 20. In some embodiments, the augmented reality system 12 may comprise, or include one or more components of the head-mounted display device described in U.S. Pat. No. 8,781,794 B2, entitled "METHODS AND SYSTEMS FOR CREATING FREE SPACE REFLECTIVE OPTICAL SURFACES," filed on Aug. 17, 2011 and U.S. patent application Ser. No. 13/211,365, entitled "HEAD-MOUNTED DISPLAY APPARATUS EMPLOYING ONE OR MORE FRESNEL LENSES," filed on Aug. 17, 2011, each of which is hereby incorporated by reference herein.

The domeless simulator system 14 includes a cockpit 36, which may comprise, for example, an accurate and realistic mockup of a cockpit of a particular vehicle being simulated, including, for example, a seat, or seats, that are located at accurate distances with respect to an instrument panel 38. The instrument panel 38 may include levers, touch screen surfaces, knobs and other input and output devices that are positioned and sized substantially the same as that of the instrument cockpit of the vehicle being simulated. In some embodiments, the domeless simulator system 14 includes a frame or support structure, which creates a window 46, and over which a darkening material 40, such as room darkening fabric or the like, may be positioned. In one embodiment, the room darkening fabric may comprise a fabric such as Edmund Optics Light Absorbing Black-Out Material #54-58, available from Edmund Optics Headquarters, 101 East Gloucester Pike, Barrington, N.J. 08007. The darkening material 40 may enhance the visual characteristics of the OTW imagery that is reflected into the eyes of the user 18 by reducing ambient light that would otherwise be transmitted through the lens 20. The domeless simulator system 14 also includes lighting features, if suitable and appropriate with respect to the instrument panel 38, to properly simulate the look of the instrument panel 38 as if the user 18 were in the vehicle being simulated. In some embodiments, an actual aircraft in a darkened hanger or other location, or which has a darkening fabric placed over the exterior or interior of the cockpit, may be used.

Figure 2:
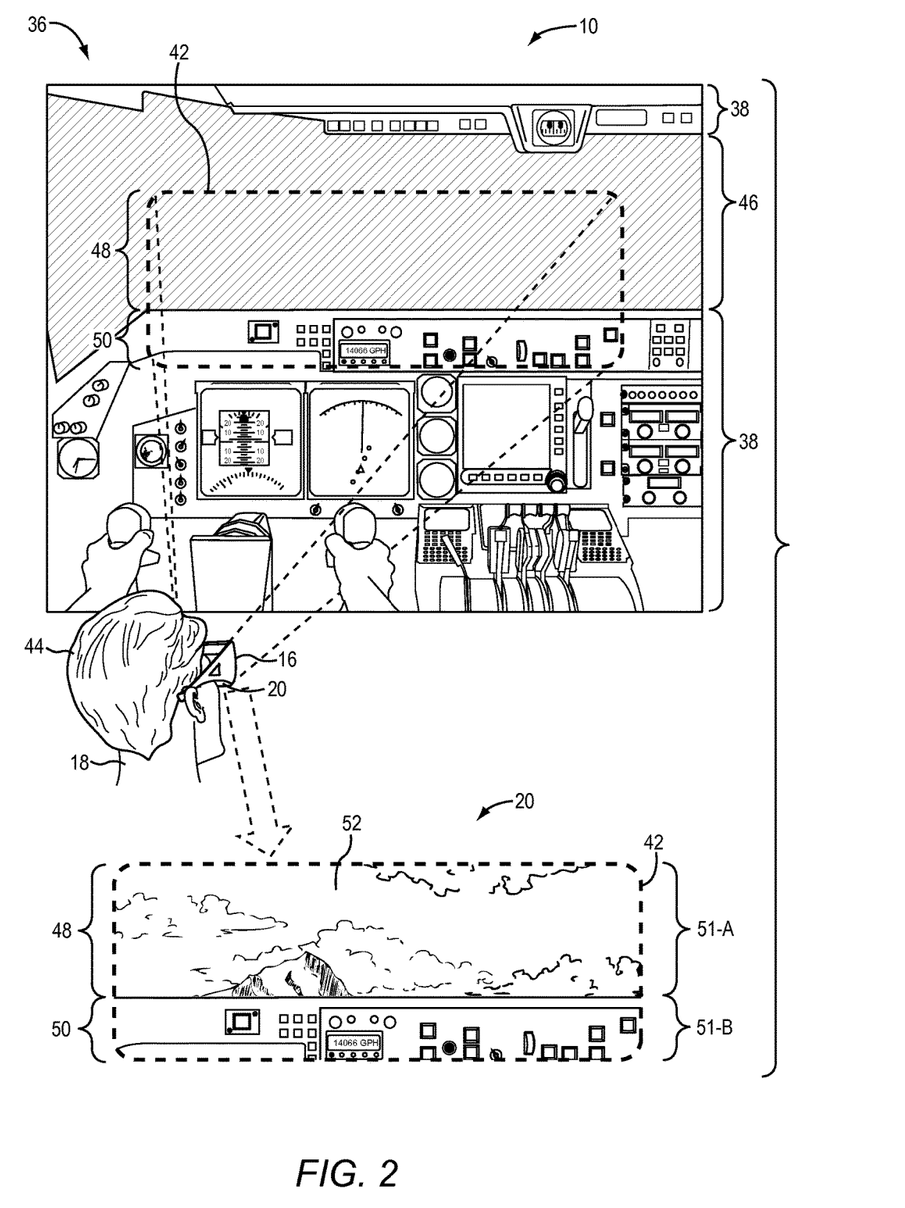
FIG. 2 is a diagram of the environment during a simulation according to one embodiment.

FIG. 2 is a diagram of the environment 10 during a simulation according to one embodiment. Certain elements discussed with regard to FIG. 1 will also be discussed in conjunction with FIG. 2. In this embodiment, the cockpit 36 comprises two seats (not illustrated), one for the user 18 who is participating in the simulation as a pilot, and one for another user (not illustrated), who is participating in the simulation as a co-pilot. The other user may also have an augmented reality system, substantially similar or identical to the augmented reality system 12 described above. Each augmented reality system may share the virtual environment model 34, such that each user would see the same virtual environment concurrently; although, based in part on the locations and orientations of the heads of the user 18 and the other user, each will likely see different portions of the virtual environment concurrently.

The scene within a FOV 42 of the lens 20 is based at least in part on the location and orientation of the head 44 of the user 18. In FIG. 2, the scene includes a portion of the instrument panel 38 and a portion of a window 46. The controller 26 utilizes sensor data generated by the sensor 24 to determine the precise location and orientation of the head 44 and, based on such sensor data, determines a scene that comes within the FOV 42. The sensor 24 may be coupled directly to the frame 16, or, in an embodiment where the augmented reality system 12 comprises a flight helmet, the sensor 24 may be coupled to the flight helmet. The scene includes an OTW scene portion 48 and a non-OTW scene portion 50. The controller 26, via the IG 32, accesses the virtual environment model 34 and generates OTW imagery 52, which visually depicts that portion of the virtual environment that is within the OTW scene portion 48. The OTW scene portion 48 corresponds to a first portion 51-A of the interior surface of the lens 20, and the non-OTW scene portion 50 corresponds to a second portion 51-B of the interior surface of the lens 20. The IG 32 provides the OTW imagery 52 to the display apparatus 22 to cause the display apparatus 22 to emit light in accordance with the OTW imagery 52 toward the interior surface of the lens 20, which is reflected into the eyes of the user 18. In particular, in one embodiment, the IG 32 determines a subset of pixels of the plurality of pixels of the display apparatus 22 that corresponds to the first portion 51-A, and causes the subset of pixels in the display apparatus 22 to emit light in accordance with the OTW imagery 52 toward the interior surface of the lens 20.

The user 18 views the non-OTW scene portion 50 of the cockpit 36 directly from the real world via the transmissive properties of the lens 20. Thus, the user 18 views the actual instrument panel 38, and thus, the non-OTW scene portion 50 of the cockpit 36 is seen at actual distances. If a hand of the user 18 were within the non-OTW scene portion 50 of the instrument panel 38, the user 18 would see the hand and movement associated with the hand with no latency. The user 18 also views the OTW imagery 52 at precisely the correct location with respect to the instrument panel 38.

The process described above occurs at the particular framerate of the augmented reality system 12, such as 30 frames per second. The sensor 24 generates sensor data that changes responsive to movements of the head 44, and thus, the particular OTW scene portion 48 and the non-OTW scene portion 50 of the scene may continually change, as may happen if the user 18 were piloting the actual vehicle being simulated.

Figure 3:
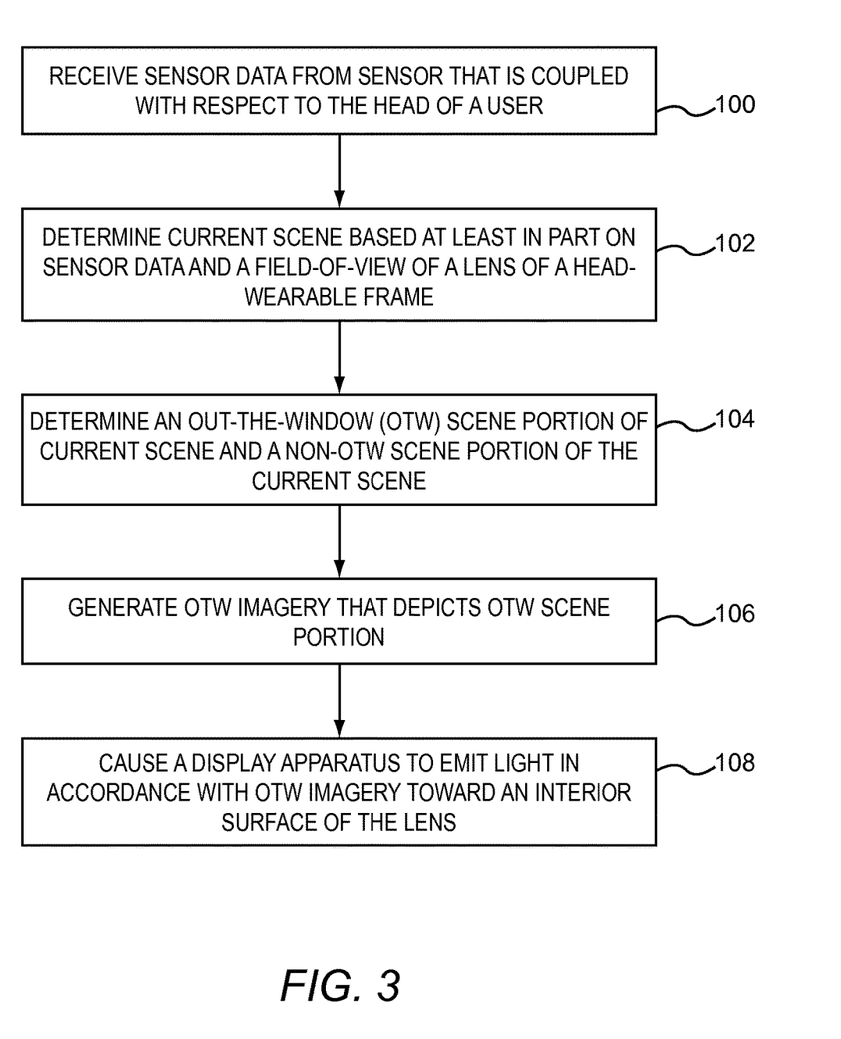
FIG. 3 is a flowchart of a method for providing out-the-window imagery to an eye of a user according to one embodiment.

FIG. 3 is a flowchart of a method for providing the OTW imagery 52 to an eye of the user 18 according to one embodiment. FIG. 3 will be discussed in conjunction with FIG. 2. The controller 26 receives sensor data from the sensor 24 that is coupled with respect to the head 44 of the user 18, the sensor data identifying the location and orientation of the head 44 (block 100). The controller 26 determines the current scene within the FOV 42 based at least in part on the sensor data and the FOV 42 of the lens 20 (block 102). The controller 26 determines the OTW scene portion 48 of the current scene and the non-OTW scene portion 50 of the current scene in the FOV 42 (block 104). The controller 26 generates the OTW imagery 52 that depicts the OTW scene portion 48 that is within the FOV 42 (block 106). The controller 26 causes the display apparatus 22 to emit light in accordance with the OTW imagery 52 toward the interior surface of the lens 20, which is reflected into the eyes of the user 18 (block 108).

Figure 4:
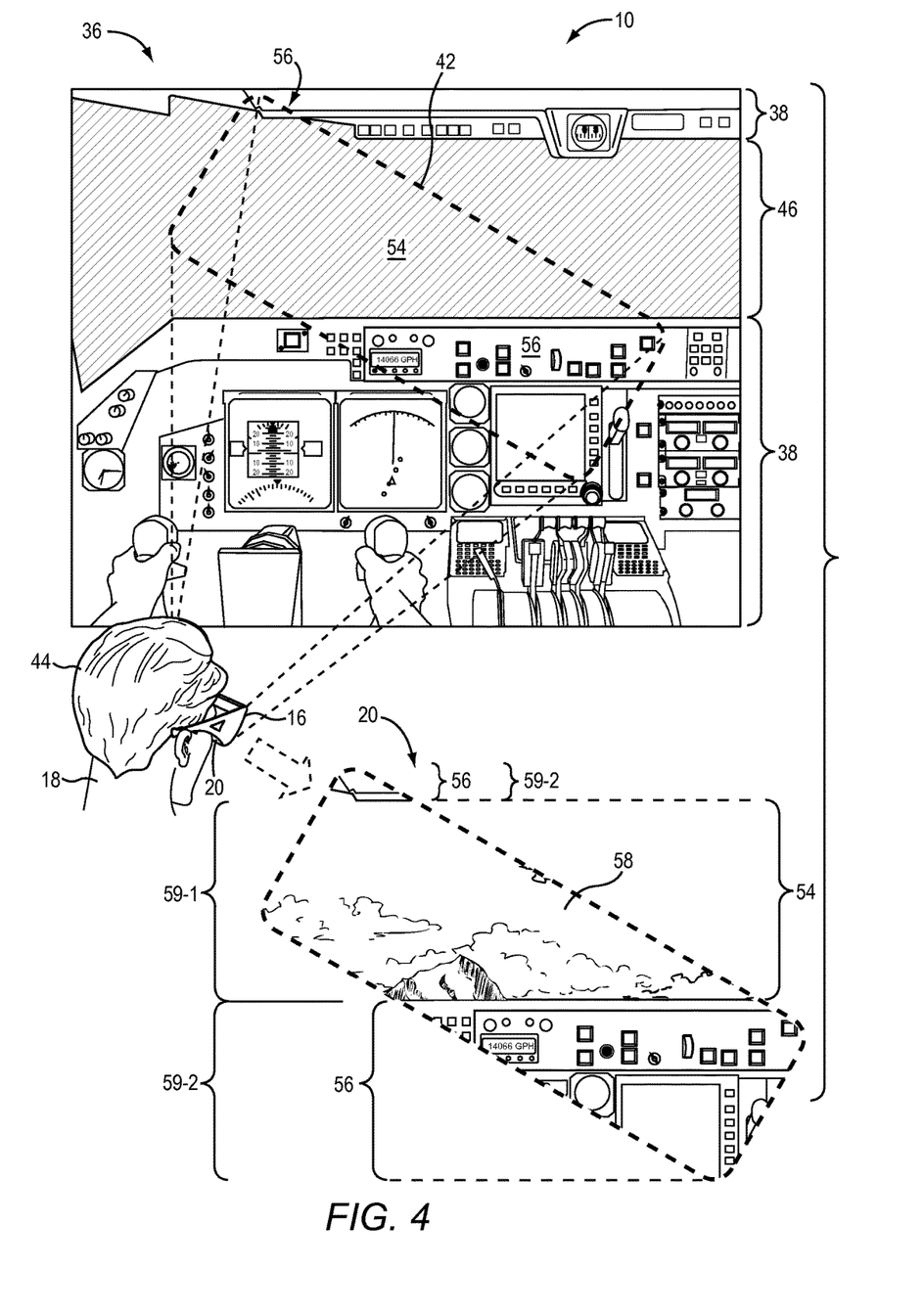
FIG. 4 is a diagram of the environment during the simulation illustrated in FIG. 2, at a subsequent point in time.

FIG. 4 is a diagram of the environment 10 during the simulation illustrated in FIG. 2, at a subsequent point in time. The user 18 has tilted his head 44. As the head 44 tilts, the sensor 24 continually generates sensor data that identifies a location and orientation of the head 44. The controller 26 determines a scene that comes within the FOV 42. The scene includes an OTW scene portion 54 and a non-OTW scene portion 56. The controller 26, via the IG 32, accesses the virtual environment model 34 and generates OTW imagery 58, which visually depicts that portion of the virtual environment that is within the OTW scene portion 54. The OTW scene portion 54 corresponds to a first portion 59-1 of the interior surface of the lens 20, and the non-OTW scene portion 56 corresponds to a second portion 59-2 of the interior surface of the lens 20. The IG 32 provides the OTW imagery 58 to the display apparatus 22 to cause the display apparatus 22 to emit light in accordance with the OTW imagery 58 toward the interior surface of the lens 20, which is reflected into the eyes of the user 18. In particular, in one embodiment, the IG 32 determines a subset of pixels of the plurality of pixels of the display apparatus 22 that corresponds to the first portion 59-1, and causes the subset of pixels in the display apparatus 22 to emit light in accordance with the OTW imagery 58 toward the interior surface of the lens 20.

The user 18 views the non-OTW scene portion 56 of the cockpit 36 via the transmissive properties of the lens 20. Thus, the user 18 views the actual instrument panel 38, and the non-OTW scene portion 56 of the cockpit 36 is therefore seen at actual distances, while the OTW imagery 58 may be focused at infinity, or at a distance as would normally occur in the actual vehicle being simulated. The user 18 also views the OTW imagery 58 at precisely the correct location with respect to the instrument panel 38.

Figure 5:
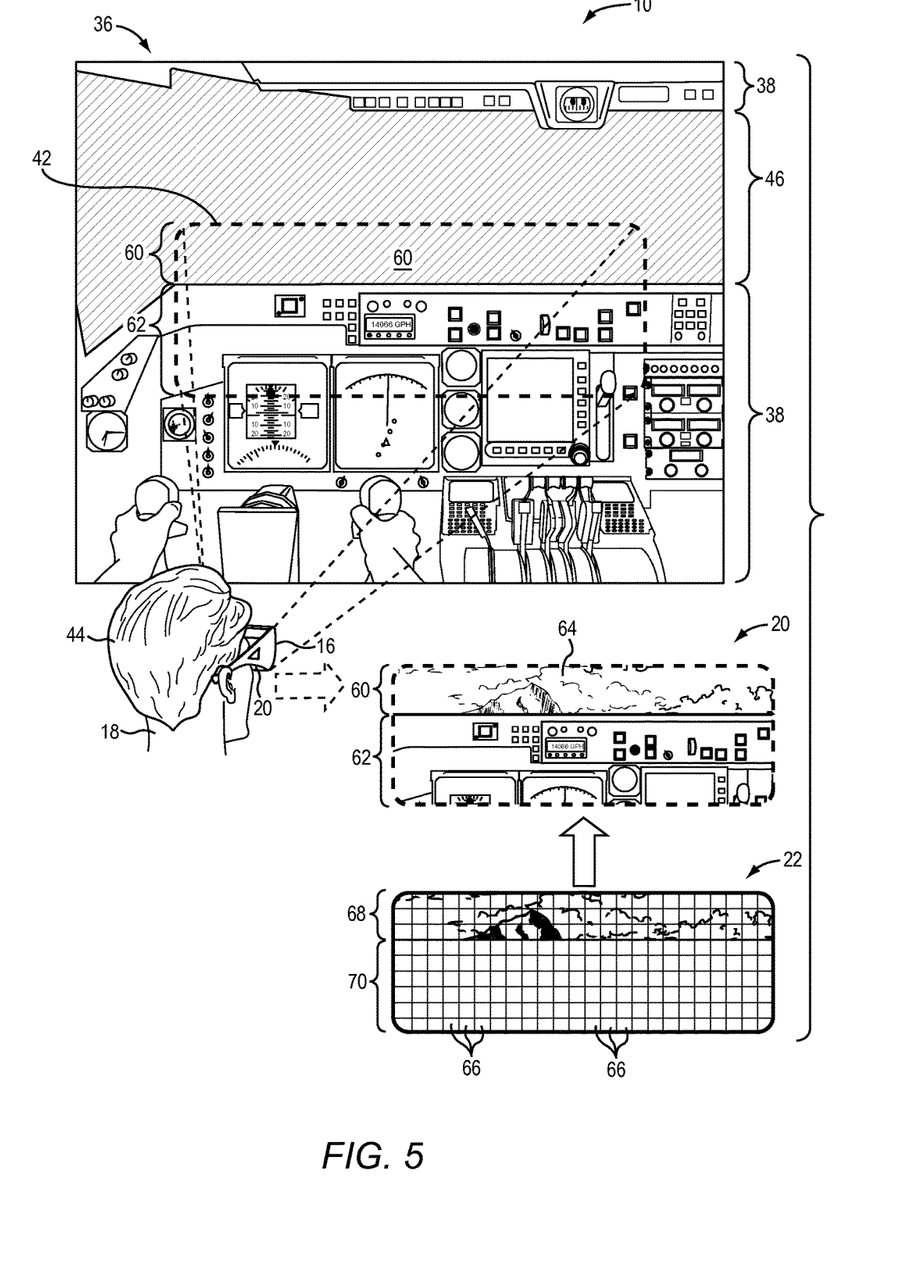
FIG. 5 is a diagram of the environment during the simulation illustrated in FIG. 4, at a subsequent point in time to that illustrated in FIG. 4.

FIG. 5 is a diagram of the environment 10 during the simulation illustrated in FIG. 4, at a subsequent point in time to that illustrated in FIG. 4. The user 18 has returned his head 44 to a substantially horizontal position. Again, as the head 44 moves, the sensor 24 continually generates sensor data that identifies a location and orientation of the head 44. The controller 26 determines a scene that comes within the FOV 42. The scene includes an OTW scene portion 60 and a non-OTW scene portion 62. The controller 26, via the IG 32, accesses the virtual environment model 34 and generates OTW imagery 64, which visually depicts that portion of the virtual environment that is within the OTW scene portion 60 of the scene. The IG 32 provides the OTW imagery 64 to the display apparatus 22 to cause the display apparatus 22 to emit light in accordance with the OTW imagery 64 toward the interior surface of the lens 20, which is reflected into the eyes of the user 18.

The user 18 views the non-OTW scene portion 62 of the cockpit 36 via the transmissive properties of the lens 20. Thus, the user 18 views the actual instrument panel 38, and the non-OTW scene portion 62 of the cockpit 36 is therefore seen at actual distances. The user 18 also views the OTW imagery 64 at precisely the correct location with respect to the instrument panel 38, such that the virtual OTW imagery 64 of the virtual environment is presented seamlessly with an actual view of the actual instrument panel 38.

The display apparatus 22 comprises a plurality of pixels 66. Each pixel 66 is mapped to a corresponding portion of the interior surface of the lens 20. The display apparatus 22 can thus precisely project the OTW imagery 64, on a pixel by pixel basis, and determine precisely where on the interior surface of the lens 20 such OTW imagery 64 will be reflected into the eye of the user 18. In this example, the OTW imagery 64 is projected from a portion 68 of the pixels 66 of the display apparatus 22. To help facilitate the view of the instrument panel 38, the display apparatus 22 may turn off each pixel 66 in a portion 70 of the pixels 66, to reduce reflections from the surface of the lens 20 other than the portion from which the OTW imagery 64 is reflected.

In one embodiment, the controller 26 first generates FOV imagery that includes all objects that would come within the entire FOV 42. The location and orientation of the head 44 is used to generate a stencil that is used to modify the FOV imagery to remove, or mask, all FOV imagery that would overlay the view of the instrument panel 38 that would otherwise be within the FOV 42, to generate the OTW imagery 64. The OTW imagery 64 is then provided to the display apparatus 22.

As discussed above, in some embodiments, the lens 20 comprises a right eye lens and a left eye lens. Thus, in such embodiments, the lens 20 has a right eye FOV, which determines the extent of the actual or virtual world that is observable at any given moment in time by the right eye, and a left eye FOV, which determines the extent of the actual or virtual world that is observable at any given moment in time by the left eye. As in real life, the scene within the right eye FOV and the scene within the left eye FOV are typically overlapping, but different. The display apparatus 22 comprises a right eye display apparatus that is mapped to an interior surface of the right eye lens and comprises a left eye display apparatus that is mapped to an interior surface of the left eye lens. The controller 26 is configured to determine a current right eye scene within the right eye FOV and a current left eye scene within the left eye FOV. The controller 26 is also configured to determine an OTW right eye scene portion and an OTW left eye scene portion. The controller 26, in conjunction with a right eye IG and a left eye IG, generates right eye OTW imagery that depicts the OTW right eye scene portion and left eye OTW imagery that depicts the OTW left eye scene portion. The controller 26 causes the right eye display apparatus to emit light in accordance with the right eye OTW imagery toward the interior surface of the right eye lens, and causes the left eye display apparatus to emit light in accordance with the left eye OTW imagery toward the interior surface of the left eye lens.

Figure 6:
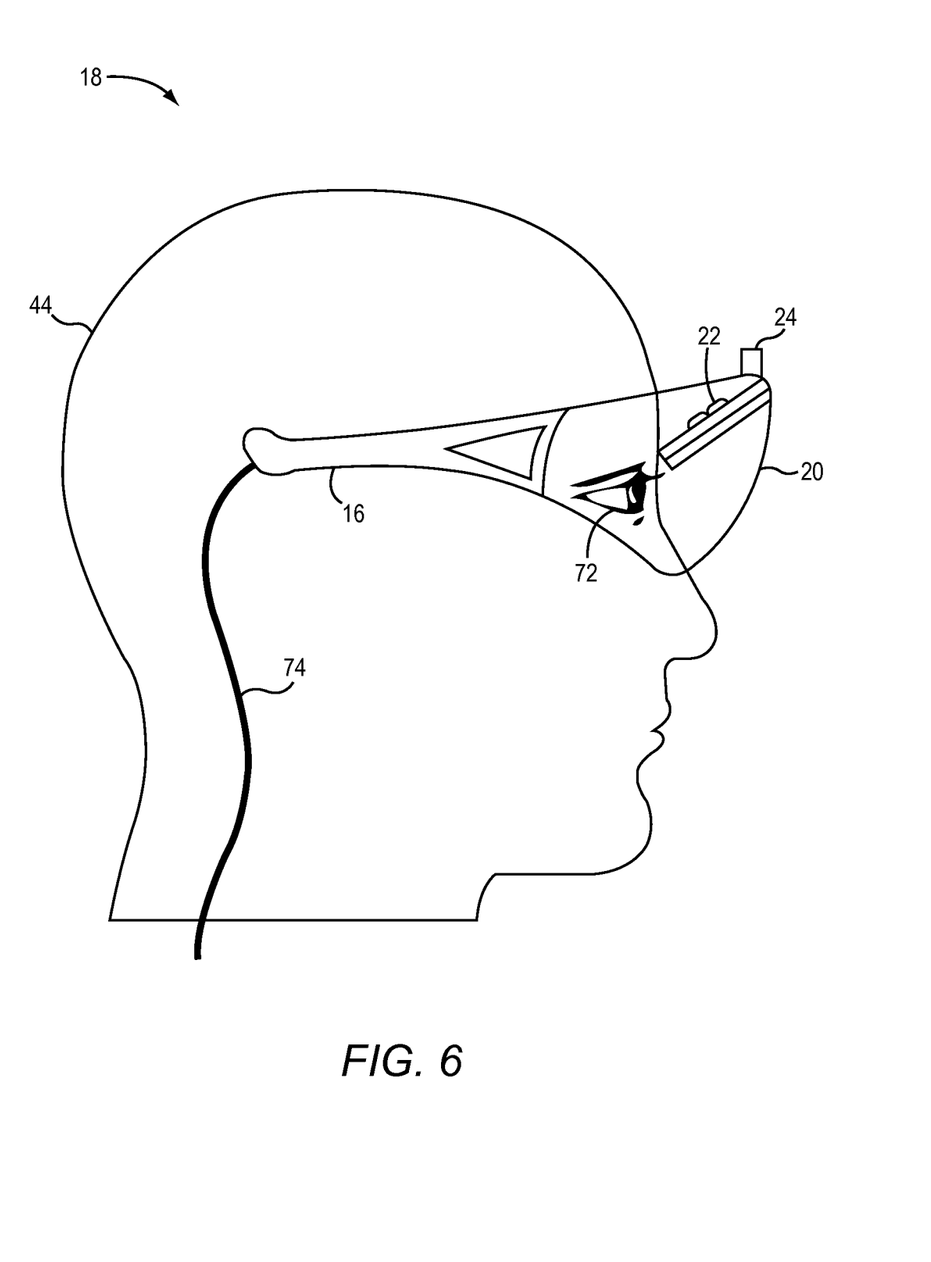
FIG. 6 is a diagram of an augmented reality system according to one embodiment.

FIG. 6 is a diagram of the augmented reality system 12 according to one embodiment. In this embodiment, the sensor 24 may be coupled directly to the head-wearable frame 16. The display apparatus 22 is positioned above an eye 72 and oriented such that the display apparatus 22 can project light onto the interior surface of the lens 20. As discussed above, in some embodiments, there is a right eye display apparatus 22 and a left eye display apparatus 22. A cable 74 may provide a path for communications between the sensor 24 and display apparatus 22 and the controller 26, as well as power for the display apparatus 22 and sensor 24, if necessary.

Figure 7:
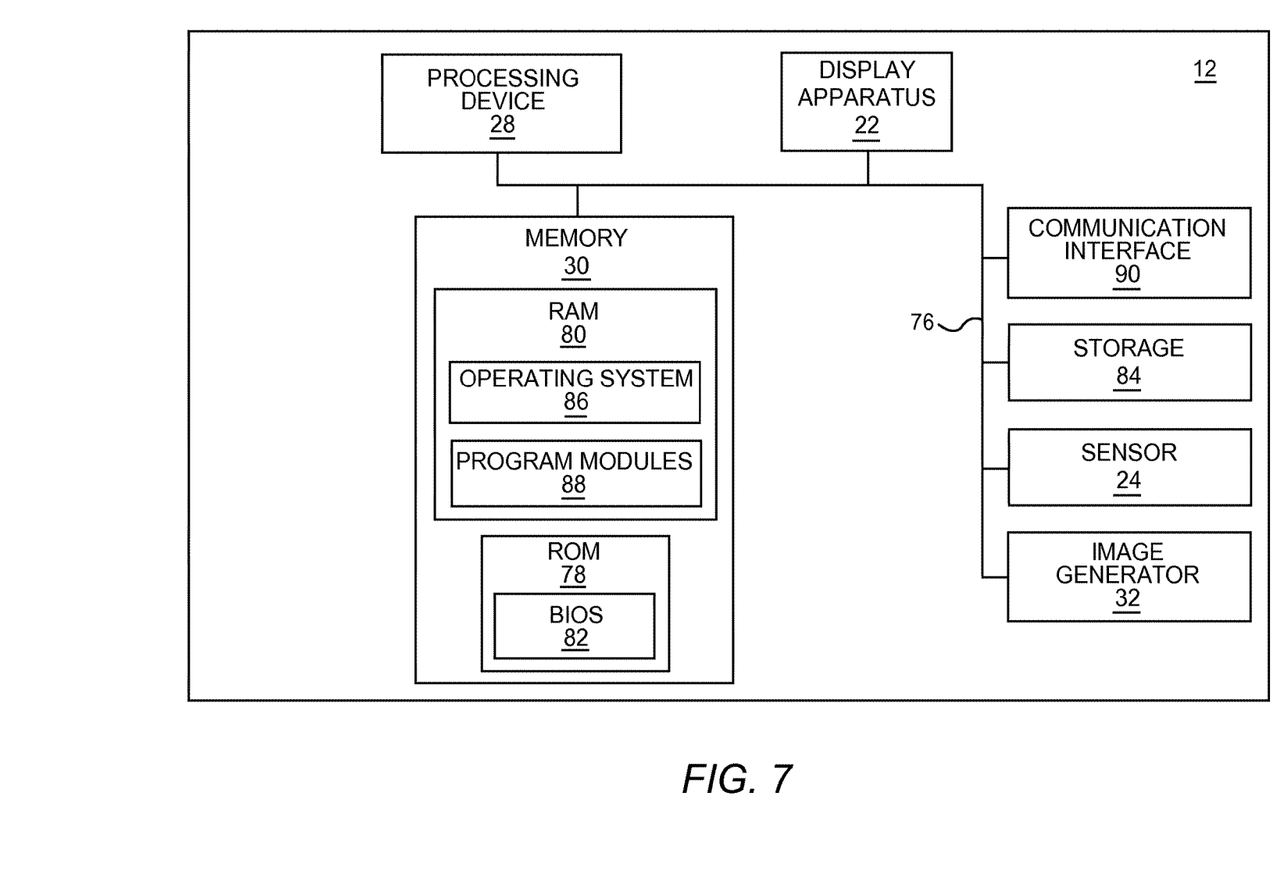
FIG. 7 is a block diagram of the augmented reality system according to one embodiment.

FIG. 7 is a block diagram of the augmented reality system 12 according to one embodiment. As discussed above, the augmented reality system 12 may have any desirable form factor, such as, by way non-limiting example, a flight helmet or eyeglasses frames. The augmented reality system 12 includes the processing device 28, the memory 30, and a system bus 76. The system bus 76 provides an interface for system components including, but not limited to, the memory 30 and the processing device 28. The processing device 28 can be any commercially available or proprietary processing device or processing devices.

The system bus 76 may be any of several types of bus structures that may further interconnect to a memory bus (with or without a memory controller), a peripheral bus, and/or a local bus using any of a variety of commercially available bus architectures. The memory 30 may include non-volatile memory 78 (e.g., read only memory (ROM), erasable programmable read only memory (EPROM), electrically erasable programmable read only memory (EEPROM), etc.) and/or volatile memory 80 (e.g., random access memory (RAM)). A basic input/output system (BIOS) 82 may be stored in the non-volatile memory 78, and can include the basic routines that help to transfer information between elements within the augmented reality system 12. The volatile memory 80 may also include a high-speed RAM, such as static RAM for caching data.

The augmented reality system 12 may further include or be coupled to a computer-readable storage 84, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 84 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of modules can be stored in the computer-readable storage 84 and in the volatile memory 80, including an operating system 86 and one or more program modules 88, which may implement the functionality described herein in whole or in part. It is to be appreciated that the embodiments can be implemented with various commercially available operating systems 86 or combinations of operating systems 86.

A portion of the embodiments may be implemented as a computer program product stored on a transitory or non-transitory computer-usable or computer-readable storage medium, such as the computer-readable storage 84, which includes complex programming instructions, such as complex computer-readable program code, configured to cause the processing device 28 to carry out the steps described herein. Thus, the computer-readable program code can comprise software instructions for implementing the functionality of the embodiments described herein when executed on the processing device 28. The processing device 28, in conjunction with the program modules 88 in the volatile memory 80, and in some embodiments the IG 32, may serve as the controller 26 for the augmented reality system 12 that is configured to, or adapted to, implement the functionality described herein.

The augmented reality system 12 may also include a communication interface 90, suitable for communicating with a network as appropriate or desired. The IG 32 may comprise any suitable proprietary or off-the-shelf IG, such as an NVIDIA® or AMD® graphics card.

Those skilled in the art will recognize improvements and modifications to the preferred embodiments of the disclosure. All such improvements and modifications are considered within the scope of the concepts disclosed herein and the claims that follow.

What is claimed is:

1. A system, comprising:
  a head-wearable frame;
  a lens coupled to the head-wearable frame, the lens being transmissive and reflective and having at least one field-of-view (FOV) and an interior surface;
  a sensor configured to be coupled with respect to a head of a user and to generate sensor data that changes responsive to movements of the head;
  a display apparatus that is mapped to the interior surface of the lens; and
  a controller coupled to the sensor and the display apparatus, the controller being configured to:
    determine a current scene of a real world environment within the FOV based at least in part on the sensor data, the real world environment comprising a window region and a non-window region;
    determine an out-the-window (OTW) scene portion comprising a portion of the window region that is in the current scene and a non-OTW scene portion comprising a portion of the non-window region that is in the current scene;
    generate OTW imagery configured to overlay the OTW scene portion without overlaying the non-OTW scene portion; and
    cause the display apparatus to emit light in accordance with the OTW imagery toward the interior surface of the lens, wherein the interior surface of the lens is configured to reflect the light toward an eye of the user to provide the OTW imagery in conjunction with the non-OTW scene portion.

2. The system of claim 1, wherein the display apparatus comprises a plurality of pixels, each pixel being mapped to a particular surface location of the interior surface of the lens.

3. The system of claim 2, wherein the controller causes the display apparatus to turn off each pixel of the plurality of pixels other than pixels that display the OTW imagery.

4. The system of claim 1, wherein the controller is further configured to:
- generate FOV imagery that includes the OTW imagery and non-OTW imagery; and
- modify the FOV imagery to mask the non-OTW imagery to generate the OTW imagery.

5. The system of claim 1, wherein the lens is configured to transmit light received from an exterior surface of the lens through the lens and out the interior surface of the lens, and to reflect the light received from the display apparatus toward an eye of the user.

6. The system of claim 1, wherein:
- the lens comprises a right eye lens and a left eye lens;
- the at least one FOV comprises a right eye FOV and a left eye FOV;
- the display apparatus comprises a right eye display apparatus that is mapped to an interior surface of the right eye lens and comprises a left eye display apparatus that is mapped to an interior surface of the left eye lens; and
- the controller is further configured to:
  - determine a current right eye scene of the real world environment within the right eye FOV and a current left eye scene of the real world environment within the left eye FOV;
  - determine an OTW right eye scene portion comprising a portion of the window region that is in the current right eye scene and a non-OTW right eye scene portion comprising a portion of the non-window region that is in the current right eye scene;
  - determine an OTW left eye scene portion comprising a portion of the window region that is in the current left eye scene and a non-OTW left eye scene portion comprising a portion of the non-window region that is in the current left eye scene;
  - generate right eye OTW imagery, configured to overlay the OTW right eye scene portion without overlaying the non-OTW right eye scene portion and left eye OTW imagery, configured to overlay the OTW left eye scene portion without overlaying the non-OTW left eye scene portion; and
  - cause the right eye display apparatus to emit light in accordance with the right eye OTW imagery toward the interior surface of the right eye lens to provide the right eye OTW imagery in conjunction with the non-OTW right eye scene portion, and cause the left eye display apparatus to emit light in accordance with the left eye OTW imagery toward the interior surface of the left eye lens to provide the left eye OTW imagery in conjunction with the non-OTW left eye scene portion.

7. The system of claim 1, further including a platform comprising a cockpit comprising an instrument panel, the instrument panel forming at least part of the non-window region of the real world environment.

8. The system of claim 7, further comprising a structure positioned over the cockpit, the structure forming at least part of the window region of the real world environment, and a darkening material configured to be positioned over the structure, the darkening material corresponding to the OTW scene portion.

9. The system of claim 1, further comprising:
- a simulation environment comprising the window region and the non-window region.

10. The system of claim 9, wherein the non-window region comprises a vehicle interior.

11. A method, comprising:
- receiving sensor data from a sensor coupled with respect to a head of a user, the sensor data identifying a location of the head and an orientation of the head;
- determining, by a controller comprising a processor, a current scene of a real world environment based at least in part on the sensor data and a field-of-view (FOV) of a lens coupled to a head-wearable frame, the lens being transmissive and reflective and having an interior surface, the real world environment comprising a window region and a non-window region;
- determining an out-the-window (OTW) scene portion comprising a portion of the window region that is in the current scene and a non-OTW scene portion comprising a portion of the non-window region that is in the current scene;
- generating OTW imagery configured to overlay the OTW scene portion; and
- causing a display apparatus to emit light in accordance with the OTW imagery toward the interior surface of the lens to provide the OTW imagery in conjunction with the non-OTW scene portion.

12. The method of claim 11, wherein the display apparatus is mapped to the interior surface of the lens.

13. The method of claim 12, wherein the display apparatus comprises a plurality of pixels, each pixel being mapped to a particular surface location of the interior surface of the lens.

14. The method of claim 13, further comprising causing the display apparatus to turn off each pixel of the plurality of pixels other than pixels that display the OTW imagery.

15. The method of claim 11, wherein the controller is further configured to:
- generate FOV imagery that includes the OTW imagery and non-OTW imagery; and
- modify the FOV imagery to mask the non-OTW imagery to generate the OTW imagery.

16. The method of claim 11, wherein the lens is configured to transmit light received from an exterior surface of the lens through the lens and out the interior surface of the lens, and to reflect the light received from the display apparatus toward an eye of the user.

17. The method of claim 11, wherein the sensor comprises an inertial measurement unit.

18. The method of claim 11, wherein:
- the lens comprises a right eye lens and a left eye lens;
- the FOV comprises a right eye FOV and a left eye FOV;
- the display apparatus comprises a right eye display apparatus that is mapped to an interior surface of the right eye lens and comprises a left eye display apparatus that is mapped to an interior surface of the left eye lens; and
- further comprising:
  - determining a current right eye scene of the real world environment within the right eye FOV and a current left eye scene of the real world environment within the left eye FOV;
  - determining an OTW right eye scene portion comprising a portion of the window region that is in the current right eye scene and a non-OTW right eye scene portion comprising a portion of the non-window region that is in the current right eye scene;
  - determining an OTW left eye scene portion comprising a portion of the window region that is in the current left eye scene and a non-OTW left eye scene portion comprising a portion of the non-window region that is in the current left eye scene;
  - generating right eye OTW imagery, configured to overlay the OTW right eye scene portion without overlaying the non-OTW right eye scene portion and left eye OTW imagery, configured to overlay the OTW left eye scene portion without overlaying the non-OTW left eye scene portion; and causing the right eye display apparatus to emit light in accordance with the right eye OTW imagery toward the interior surface of the right eye lens to provide the right eye OTW imagery in conjunction with the non-OTW right eye scene portion, and causing the left eye display apparatus to emit light in accordance with the left eye OTW imagery toward the interior surface of the left eye lens to provide the left eye OTW imagery in conjunction with the non-OTW left eye scene portion.

19. The method of claim 11, wherein a first portion of the interior surface of the lens corresponds to the OTW scene portion, and a second portion of the interior surface of the lens corresponds to the non-OTW scene portion; and further comprising:

determining a subset of pixels of a plurality of pixels of the display apparatus that correspond to the first portion of the interior surface; and causing the subset of pixels in the display apparatus to emit light in accordance with the OTW imagery toward the interior surface of the lens.

20. A method, comprising:

receiving sensor data from a sensor coupled with respect to a head of a user, the sensor data identifying a location of the head and an orientation of the head;

determining, by a controller comprising a processor, a current scene of a real world environment based at least in part on the sensor data and a field-of-view (FOV) of a lens coupled to a head-wearable frame, the lens being transmissive and reflective and having an interior surface, the real world environment comprising a window region and a non-window region;

determining an out-the-window (OTW) scene portion comprising a portion of the window region that is in the current scene and a non-OTW scene portion comprising a portion of the non-window region that is in the current scene, wherein a first portion of the interior surface of the lens corresponds to the OTW scene portion and a second portion of the interior surface of the lens corresponds to the non-OTW scene portion;

generating OTW imagery that depicts the OTW scene portion;

determining a subset of pixels of a plurality of pixels of a display apparatus that corresponds to the first portion of the interior surface; and causing the subset of pixels in the display apparatus to emit light in accordance with the OTW imagery toward the interior surface of the lens.

* * * * *